United States Patent [19]

van Rooij et al.

[11] Patent Number: 4,543,081
[45] Date of Patent: Sep. 24, 1985

[54] TRANSMISSION CHAIN

[75] Inventors: Jacobus H. M. van Rooij; Leonardus M. A. Vaessen, both of Nuenen, Netherlands

[73] Assignee: Varitrac AG, Switzerland

[21] Appl. No.: 527,660

[22] Filed: Aug. 30, 1983

[30] Foreign Application Priority Data

Sep. 1, 1982 [NL] Netherlands .................... 8203421

[51] Int. Cl.$^4$ ............................................... F16G 1/21
[52] U.S. Cl. .................................. 474/242; 474/229; 474/244; 474/245
[58] Field of Search ............... 474/214, 219, 223, 201, 474/215, 240, 242, 244, 245

[56] References Cited

U.S. PATENT DOCUMENTS

| 2,279,134 | 4/1942 | Dalrymple | 474/242 X |
| 3,407,672 | 10/1968 | Keller | 474/242 |
| 3,688,595 | 9/1972 | Bauer | 474/201 X |
| 4,337,057 | 6/1982 | Horowitz et al. | 474/242 |
| 4,349,343 | 9/1982 | Stephanoff et al. | 474/245 |

FOREIGN PATENT DOCUMENTS

| 86872 | 8/1983 | Fed. Rep. of Germany | 474/242 |
| 1168304 | 12/1958 | France | 474/245 |

Primary Examiner—James A. Leppink
Assistant Examiner—Frank H. McKenzie, Jr.
Attorney, Agent, or Firm—Ostrolenk, Faber, Gerb & Soffen

[57] ABSTRACT

A transmission chain comprising links and hinge pins extending through link apertures an intermediate member being received between each hinge pin and the opposite aperture sides of a plurality of adjacent links, the length of the intermediate member being equal to or somewhat less than the length of the hinge pin a limited displacement thereof in the longitudinal direction being possible.

5 Claims, 10 Drawing Figures

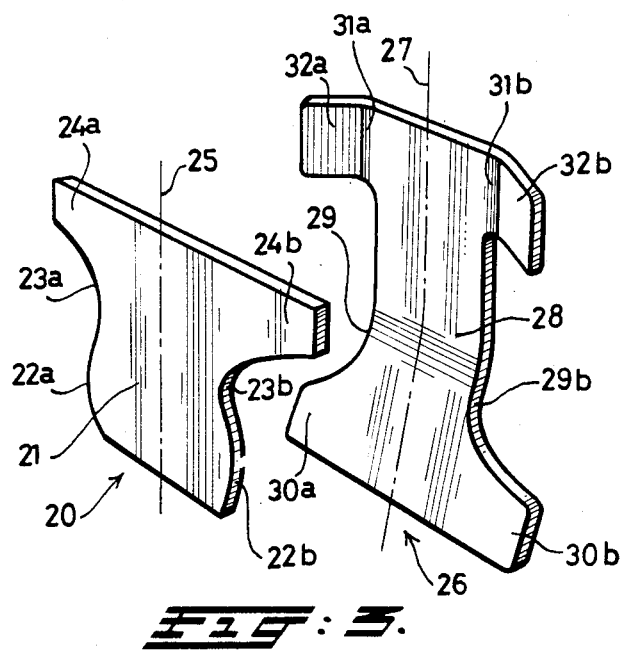
FIG. 3.
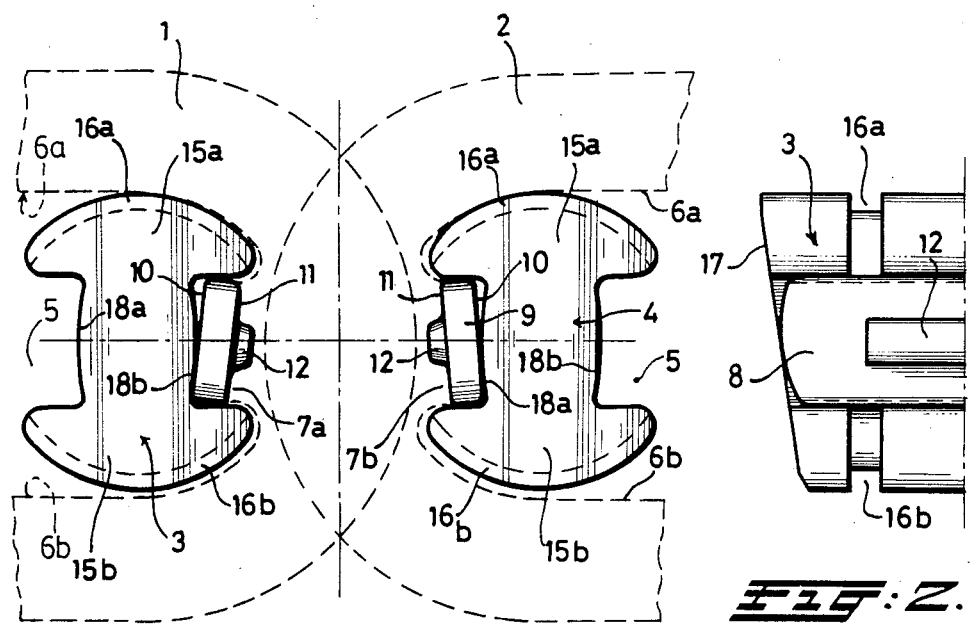
FIG. 1.
FIG. 2.

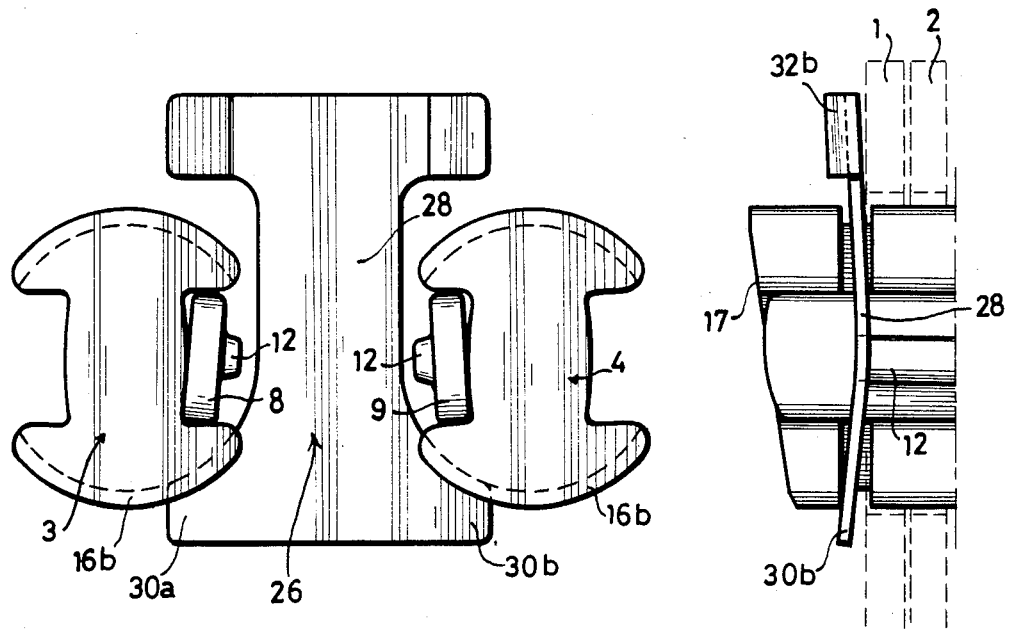
Fig: 4a.
Fig: 4b.
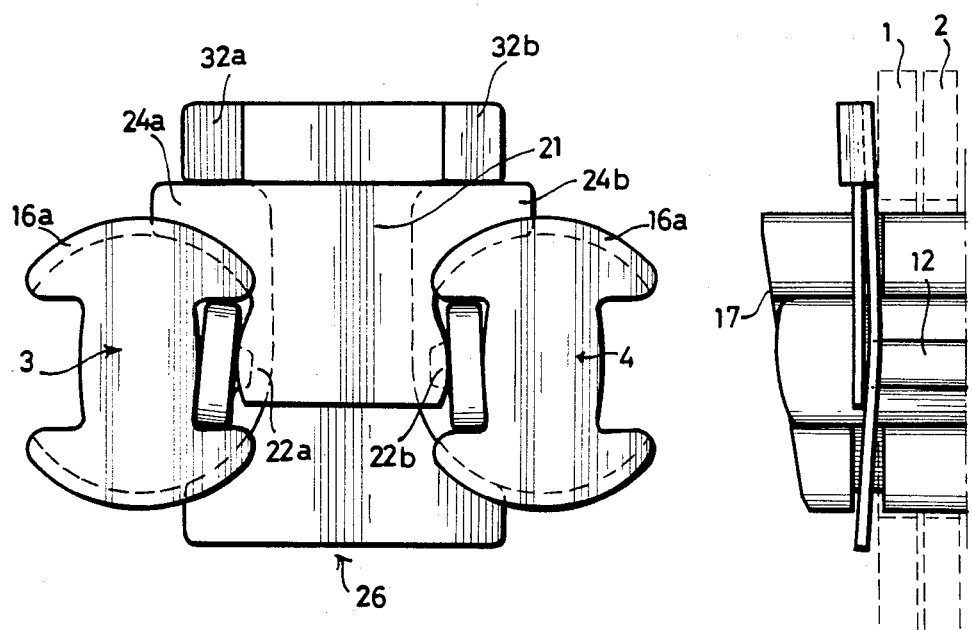
Fig: 5a.
Fig: 5b.

TRANSMISSION CHAIN

BACKGROUND OF THE INVENTION

1. Field of the Invention

The invention relates to a transmission chain for a cone pulley transmission comprising a plurality of intercoupled links each receiving two hinge pins which are situated transversely to the link plane and extend through link apertures, and whose end surfaces co-operate, as frictional surfaces, with the cone surfaces and whose longitudinal sides form surfaces for rolling contact, having a radius of curvature differing from that of the co-operating rolling-contact surface, an intermediate member being received between each hinge pin on the one hand, and the oppositely situated upright aperture sides of a plurality of adjacent links, on the other hand, the first longitudinal side of said intermediate member being coupled to the link aperture sides and the oppositely situated second longitudinal side forming the rolling-contact surface co-operating with the pin longitudinal side.

2. Description of the Prior Art

A transmission chain is described in Netherlands Patent Application 8102868. This transmission chain is provided with intermediate members the length of which is equal to the thickness of the packet of links and thus appreciably smaller than the length of the pins; intermediate member and links are locked together against movement with respect to the links by means of two locking clips on each link.

In practice these locking clips tend to fracture. The reason thereof must be because the surface of an intermediate member is never exactly perpendicular to the edges of the link against which they rest and, therefore, the pulling forces between an intermediate member and the links results in a force which acts in the longitudinal direction of the intermediate member and shifts this member until it lies against the locking clip; this force can be so great that eventually the locking clip is destroyed.

SUMMARY OF THE INVENTION

It is a primary object of the invention to overcome this drawback. According to the invention the length of the intermediate member is at maximum equal to or somewhat less than the length of the hinge pin and the intermediate member is so secured with respect to the pin that a limited displacement thereof in the longitudinal direction is possible into a position in which one end thereof projects past the pin.

Such a displacement of the intermediate member in its longitudinal direction is not detrimental for a proper operation of the chain, as the intermediate member will be pressed back into its original position when the pin against which it lies enters between the conical disks. There will never be a displacement in one direction which is so great that excessive forces are exerted on the locking element.

In a preferred embodiment the intermediate member has, on the side co-operating with the links, a transversely projecting abutment surface at a distance from each end and each pair of adjacent intermediate members of which these sides face each other, are secured, with respect to the hinge pins co-operating therewith and having transverse securing grooves in the two heads by means of a first T-shaped securing plate, whose two arms fit into the head grooves and whose body abuts the abutment surfaces in combination with a second longer T-shaped securing plate which is disposed in the inverted position and the arms of which fit into the other head grooves and whose body bears an abutment situatated above the top edge of the first securing plate and co-operating therewith.

The two plate-shaped elements which in combination constitute the locking element can be fitted quite easily and remain in place after fitment.

Preferably at least one of the securing plates is arched in the longitudinal direction thereof so that the combination has a certain elasticity.

A preferred embodiment is such that the abutment for the first securing plate is formed on the second securing plate by the two bent ends of a continuation of the body part extending transversely thereof.

It is furthermore advantageous when the transverse abutment surfaces on the intermediate member are formed by the respective ends of a longitudinally extending securing ribs projecting from the intermediate member side.

The presence of such a rib is an advantage because this rib also serves for locking of the intermediate member with respect to the links. The features of the present invention which are believed to be novel are set forth with particularity in the appended claims.

DESCRIPTION OF THE DRAWINGS

FIG. 1 is an end elevation of two transmission chain links, two pins and two intermediate members;

FIG. 2 is a side elevation of a part of a hinge pin and the associated intermediate member;

FIG. 3 is a perspective view of a preferred embodiment of securing members according to the invention;

FIG. 4a is an end elevation and FIG. 4b a side elevation of the hinge pins shown in FIG. 1, with the first securing plate fitted;

FIGS. 5a and 5b are corresponding illustrations and illustrate the two securing plates;

DESCRIPTION OF THE PREFERRED EMBODIMENTS

Figure 6:
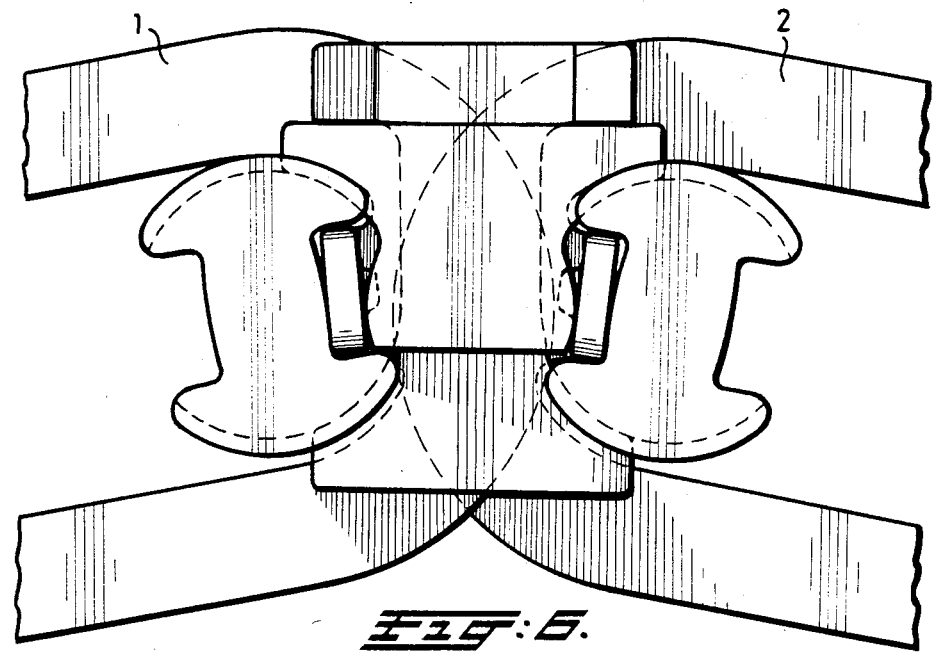
FIG. 6 is a similar view to FIG. 5a showing the secured link members as well.

The transmission chain according to the invention is of the type described in Netherlands Patent Application No. 7906681 and in Netherlands Patent Application No. 8102868. A chain of this kind is intended more particularly for use in a continuously variable transmission with cone pulleys. In a transmission chain of this kind a link always co-operates with two pins; a side surface of each pin co-operates with a contact surface of an intermediate member placed between the associated pin and an upright boundary of the aperture in the link; as they enter the cone pulleys the pins are clamped therebetween and driven. In a transmission chain of this kind the power is transmitted by tension.

FIG. 1 is an end elevation showing part of two links 1, 2 and the two pins 3, 4. Pin 3 co-operates with link 1 and pin 4 with link 2. The central aperture 5 of each link is defined by the longitudinal edges 6a, 6b and the upright edges 7a, 7b. Each pin 3, 4 co-operates with the associated links via two intermediate contact members, although only one is shown per pin, for the sake of clarity, i.e. intermediate member 8 in the case of pin 3 and intermediate member 9 in the case of pin 4. As described in Netherlands Patent Application No. 8102868, each intermediate member overlaps a number of links situated adjacent one another in the transverse direction of the chain. It has a substantially flat longitudinal side 10 which forms the rolling-contact surface co-operating with the hinge pin; the other longitudinal side 11 has a projecting rib 12 over part of the length.

When viewed in cross-section, each hinge pin has two head surfaces 15a, 15b in which narrow grooves 16a, 16b are formed at a short distance from the pin end 17; the heads merge into longitudinal surfaces 18a, 18b which roll over the rolling-contact intermediate members. A configuration of this kind is described in the above noted Netherlands Patent Application 8102868.

Contrarily, however, to the structure as described in this patent application, the intermediate member are not appreciably smaller than the hinge pins but are either substantially equal in length to the latter or just slightly shorter. Also, they are so secured with respect to the pins that they can shift longitudinally to such an extent that the ends thereof can project somewhat outside the pin ends. A preferred embodiment of the securing of the intermediate members on the pins will be described hereinafter.

Two securing plates are used and are shown in perspective in FIG. 3. The first securing plate 20 has a substantially T-shaped configuration with a body part 21 which is widened by the parts 22a, 22b at the bottom and which extends via curved transitional portions 23a, 23b into the two arm ends 24a, 24b projecting on either side. The whole arrangement is symmetrical with respect to the longitudinal axis 25.

The second securing plate denoted by the reference 26 is also symmetrical with respect to the longitudinal axis 27 thereof and consists of the body part 28 which extends, via the two transitions 29a, 29b, at the bottom, into the arm portions 30a, 30b; at the top the body continues in the form of the arms 31a, 31b, the ends 32a, 32b of which are bent obliquely forwards.

The manner in which these securing plates are fitted is explained with reference to FIGS. 4–6. First of all, as shown in FIGS. 4a and 4b, the second securing plate 26 is fitted so that the arms 30a, 30b fall into the head grooves 16b of the two pins 3, 4. The body 28 is of course narrower than the distance between the ribs 12 of the intermediate surfaces 8, 9. The first securing plate 20 is then fitted. It will lie in front of securing plate 26 as viewed in the direction of the pin end 17. The widened body portions 22a, 22b of this securing plate fall in front of the ends of the ribs 12 and the arm ends 24a, 24b will lie under the bent arm ends 32a, 32b at the securing plate 26. These arm ends 24a, 24b also fit into the top pin grooves 16a.

Neither of the securing plates 20, 26 can now move upwardly or downwardly; the link pack and the intermediate members 8, 9 can move in the longitudinal direction of the pin over a limited distance. The effect of this will be explained with reference to FIGS. 7 and 8.

Figure 7:
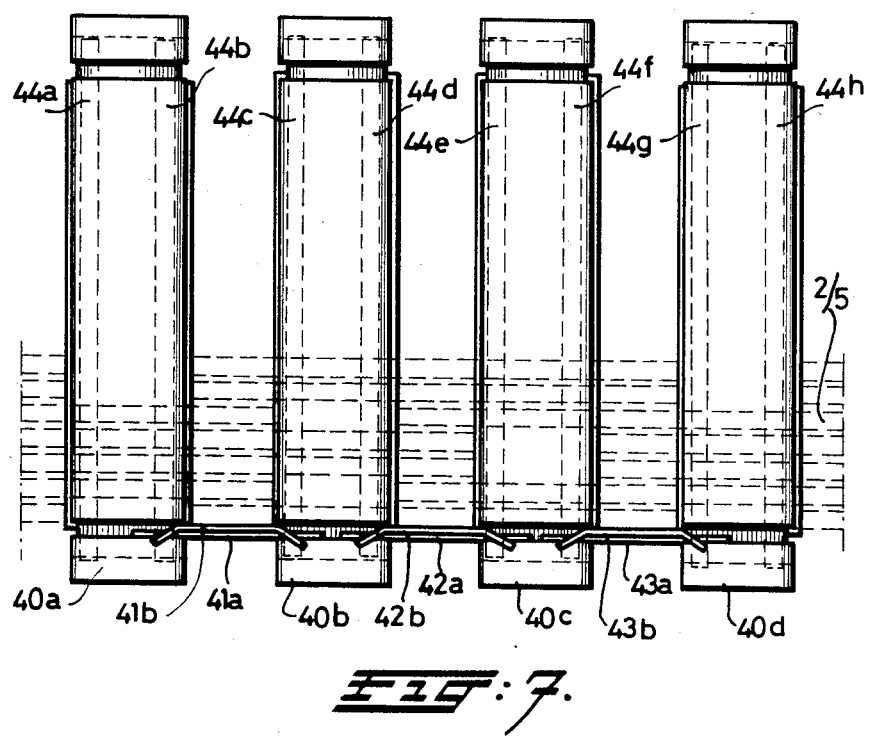
FIG. 7 is a top plan view of part of the transmission chain according to the invention and shows movement of the intermediate members made possible according to the invention.

FIG. 7 shows four pins 40a–40d, of which pins 40a, 40b co-operate with the securing plates 41a, 41b and pins 40b and 40c with securing plates 42a, 42b, pins 40c and 40d with securing plates 43a, 43b, and so on. The intermediate members are denoted by references 44a–44h and the link pack disposed and arranged in known manner (see the abovementioned Netherlands Patent Applications) is denoted by reference 45.

As shown in FIG. 7, the intermediate members are able to shift laterally in response to the longitudinally directed forces exerted thereon during operation. In respect of pin 40a, the intermediate members 44a, 44b are shown in the drawing as being moved away in the downward direction; in the case of pin 40b, the intermediate members 44d, 44e have been moved upwardly, and this also goes for pin 40c with the intermediate members 44e, 44f; the intermediate members 44g and 44h which co-operate with pin 40d have remained in their normal position. The situation is corrected during the entry of the pins between the cone pulleys: since the length of the intermediate members is at maximum equal to that of the pins or slightly less, projecting intermediate members will be pushed back to the middle position without powerful forces needing to be exerted thereon, as the pin with which said intermediate members co-operate passes through the cone pulleys.

Figure 8:
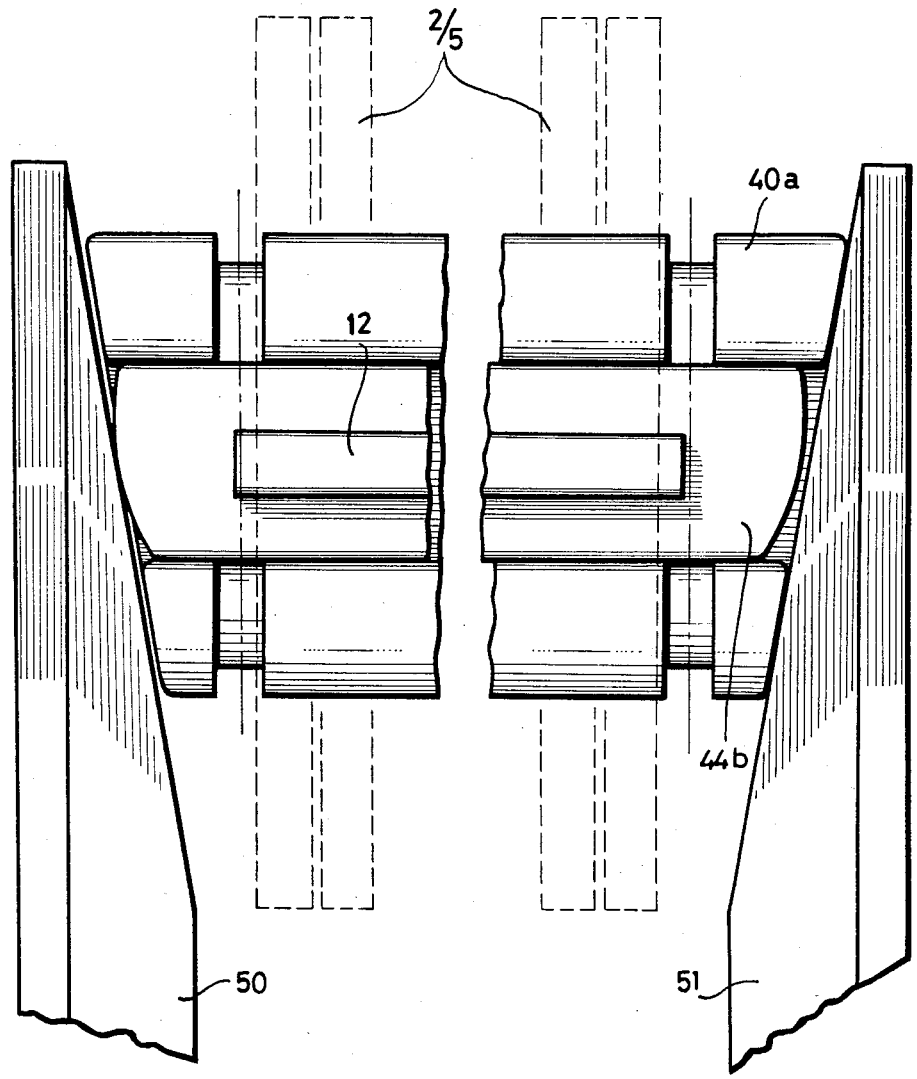
FIG. 8 is an end elevation to an enlarged scale showing the way in which the intermediate members co-operate with the cone pulleys.

FIG. 8 shows two cone pulleys 50 and 51 with the pin 40a between them, the intermediate member 44b having shifted to the left slightly in the drawing; it will come into contact with cone pulley 50 before the left-hand end of the pin 40a during entry of the chain and is pressed back into the middle positon by the left-hand pulley 50.

Although the present invention has been shown and described in connection with a preferred embodiment thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. A transmission chain for a cone pulley having oppositely facing cone surfaces, the chain comprising:

a plurality of intercoupled links, each link having a longitudinally extending body which is aligned with a longitudinal direction of the transmission chain, the link body including first and second longitudinally opposite end portions, a hinge pin aperture defined in and extending transversely to the link and first and second link upright aperture surfaces located in the hinge aperture, the first upright aperture surface located toward the first end portion and facing toward the second upright aperture surface which is located toward the second end portion of the link;

a plurality of hinge pins, each hinge pin passing through a plurality of the hinge pin apertures to effect an intercoupling of the links through which the respective pin passes, each hinge pin comprising an elongate body having a pair of opposite, curved rolling contact surfaces which face toward respective groups of upright aperture surfaces located in the links through which the hinge pin passes, each hinge pin further having a pair of opposite end surfaces shaped for frictional sliding engagement with the cone surfaces of the cone pulley;

a plurality of elongate intermediate members, each being located between a respective hinge pin and a respective group of link upright aperture surfaces, each intermediate member having a rolling contact surface which extends along a length of the intermediate member and having an opposite link contact surface, the link contact surface of the intermediate member being in contact with the respective group of link upright aperture surfaces to which the link contact surface is adjacent, and the rolling contact surface of the intermediate member facing toward one of the rolling contact surfaces of its respective hinge pin, the rolling contact surfaces of the hinge pin and the intermediate member having different radii of curvature to permit rolling engagement therebetween;

each of the hinge pins having a predetermined length, each of the intermediate members having a length which is not larger than the length of the respective hinge pin, the chain including means for securing each intermediate member to its respective hinge pin, the securing means being adapted to permit limited displacement of the intermediate member in a direction along the length thereof, the displaceability of the intermediate member permitting the intermediate member to project past one or the other of the end surfaces of its respective hinge pin.

2. A transmission chain according to claim 1, wherein each intermediate member further comprises first and second opposite ends and first and second projecting abutments located, respectively, on the link contact surface of the intermediate member, adjacent to and spaced from the first and second ends, the projecting abutments extending transversely with respect to the length of the intermediate member; each hinge pin further comprising a securing groove located, respectively, adjacent to the first and second ends thereof, the securing grooves extending transversely to the hinge pin; the securing means including a plurality of pairs of securing plates, each pair of securing plates being located between one end of adjacent hinge pins, each pair of plates including a first T-shaped securing plate having two arms which fit into securing grooves of the adjacent hinge pins and a body which abuts the projecting abutment of the intermediate member located adjacent thereto, and a second T-shaped securing plate which engages with the first T-shaped securing plate and which is disposed in an inverted position with respect thereto, the second T-shaped securing plate having respective arms which fit into the grooves of the adjacent hinge pins and a body which complements the body of the first T-shaped securing plate to complete the abutment engagement between the intermediate members and the securing plates.

3. A transmission chain according to claim 2, in which at least one of the securing plates is arched along a longitudinal direction thereof.

4. A transmission chain according to claim 2, in which the second securing plate includes two bent ends formed of a continuation of the body thereof, the ends extending transversely with respect to the body, the two bent ends providing an abutment for the body of the first securing plate.

5. A transmission chain according to claim 2 or 3, in which the transverse abutment surfaces on the intermediate member are formed by respective ends of a longitudinally extending securing rib projecting from the link contact surface thereof.

* * * * *

UNITED STATES PATENT AND TRADEMARK OFFICE
CERTIFICATE OF CORRECTION

PATENT NO. : 4,543,081
DATED : September 24, 1985
INVENTOR(S) : van Rooij et al.

It is certified that error appears in the above-identified patent and that said Letters Patent are hereby corrected as shown below:

On line [73] of the cover page, delete:

"Varitrac AG, Switzerland" and insert

--Volvo Car B.V., The Netherlands--.

Signed and Sealed this

Twenty-fifth Day of February 1986

[SEAL]

Attest:

DONALD J. QUIGG

Attesting Officer

Commissioner of Patents and Trademarks